United States Patent
Yu et al.

(10) Patent No.: US 8,077,906 B2
(45) Date of Patent: Dec. 13, 2011

(54) APPARATUS FOR EXTRACTING CAMERA MOTION, SYSTEM AND METHOD FOR SUPPORTING AUGMENTED REALITY IN OCEAN SCENE USING THE SAME

(75) Inventors: Jung Jae Yu, Sungnam (KR); Chang Joon Park, Daejeon (KR); Jae Heon Kim, Daejeon (KR); In Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1005 days.

(21) Appl. No.: 11/743,149

(22) Filed: May 2, 2007

(65) Prior Publication Data

US 2008/0075358 A1   Mar. 27, 2008

(30) Foreign Application Priority Data

Sep. 27, 2006   (KR) ........................ 10-2006-0094267

(51) Int. Cl.
  *G06K 9/00*   (2006.01)
(52) U.S. Cl. ........ 382/100; 382/103; 382/104; 382/106; 382/107; 382/154; 382/325; 340/425.5; 345/427; 348/208.6
(58) Field of Classification Search .................. 382/154, 382/103, 100, 276, 308, 181, 231, 106, 109, 382/153, 254, 325
See application file for complete search history.

(56) References Cited

U.S. PATENT DOCUMENTS 6,349,114 B1   2/2002 Mory
7,123,777 B2 *  10/2006 Rondinelli et al. ........... 382/284

FOREIGN PATENT DOCUMENTS

| KR | 100248374 B1 | 12/1999 |
| KR | 1020010055957 A | 7/2001 |
| KR | 1020020077685 A | 10/2002 |

OTHER PUBLICATIONS

Fung et al, "OpenVIDIA: Parallel GPU Computer Vision", Nov. 6, 2005, ACM, 849-852.*
Kim, J.S. and Kweon, I.S., "A Unified Framework of Geometric Constraints on Camera Calibration", 18th Workshop of year of 2006 on Image Processing and Understanding, Feb. 8-10, 2006.
Pollefeys, M. et al., "Visual Modeling with a Hand-Held Camera", International Journal of Computer Vision, 59 (3):207-232 (2004).

* cited by examiner

*Primary Examiner* — Brian Q Le
*Assistant Examiner* — Edward Park (57) ABSTRACT

A system and method for supporting augmented reality in an ocean scene is provided. According to the system and method, camera rotation information is extracted from horizontal line information of a sea extracted from an original image including a focal length and at least two first natural feature point tracking data existing on a sea plane and a plane parallel to the sea plane, using long-distance background features; camera movement is sequentially calculated from the camera rotation information and at least two natural feature point tracking data existing on the sea plane of the original image; and a computer graphics object is placed on a ground plane by importing camera position data, and a rendering is performed as moving the camera. Accordingly, the camera rotation and the camera movement can be accurately calculated, assuming that the camera focal length information is known at the time of capturing a moving image with a sea image for a background, and thus the CG/real scene synthesis with the sea for a background can be accomplished more realistically and accurately during the production of videos such as movie and drama.

9 Claims, 6 Drawing Sheets
(2 of 6 Drawing Sheet(s) Filed in Color)

APPARATUS FOR EXTRACTING CAMERA MOTION, SYSTEM AND METHOD FOR SUPPORTING AUGMENTED REALITY IN OCEAN SCENE USING THE SAME

BACKGROUND OF THE INVENTION

1. Field of the Invention

The present invention relates to a system and method for supporting augmented reality in an ocean scene, and more particularly to a system and method for supporting augmented reality in an ocean scene, which can extract a camera motion in a state that it is difficult to perform camera auto-calibration using the existing method, by actively using prior knowledge about background geometry.

2. Background of the Related Art

Generally, in order to acquire geometrical information of an object from a moving image acquired through a camera and to acquire motion information (i.e., an external variable) and status information (i.e., an internal variable) of the camera during image capturing, a camera calibration process for estimating variables between image information acquired from the camera and real geometrical information of the object is essentially required. In the case of acquiring values of the external variable (i.e., moving information of the camera) and the internal variable (i.e., status information of the camera) of the camera during image capturing, the easiest and most accurate method that can be used is to obtain information of the camera by hardware using a motion control camera (MCC). However, this method has problems in that it is impossible to apply the method to the previously captured images and the MCC equipment for implementing the method is very expensive, and has drawbacks in that it is difficult to use the method on the filming spot such as sea background. Accordingly, methods for performing camera auto-calibration by software on the basis of image processing techniques have been researched. These methods are classified into 'a method using an artificial calibration object' and 'a self-calibration method using natural features'.

Here, the method using an artificial calibration object is a method of performing auto calibration by capturing an image of a calibration tool having the shape of a three-dimensional (3D) rectangular parallelepiped and solving the geometrical relation between the shape in space of the rectangular parallelepiped and the projective image. Although this method has been widely used up to now and has the advantage that it produces a relatively accurate result, it has limitations in that the calibration object has the characteristic of a typical rectangular parallelepiped and the shape of the calibration object should be caught in an image sequence of which the auto calibration is to be performed. As a result, this method is not suitable as the camera auto-calibration method for the synthesis of real scenes, and moreover, it is impossible to perform the method in a sea background to be handled according to the present invention.

On the other hand, the self-calibration method is a method of performing the calibration by extracting natural feature points from images captured at various angles and performing the calibration using the corresponding relations among the natural feature points. According to this method, if the positions of the corresponding points are once confirmed in the respective frames, all frames are mated by twos or threes, and projective reconstruction is performed using a fundamental or essential matrix or a trifocal tensor. Thereafter, on the basis of the assumption for an "image of absolute conic (IAC)" method proposed by Richard Hartley, a camera internal variable matrix is obtained, and then a transform matrix for transforming a camera matrix into a metric space from a projective space is obtained. Since this method does not use the artificial calibration object as in the 'method using an artificial calibration object', it is useful for the real scene synthesis. However, noise is added in the process of finding relations among the corresponding points in the respective frames, and this may cause the performance to deteriorate. In practice, an LM (Levenberg Marquardt) algorithm should be inserted into many parts in order to make a robust system. However, in the sea image to be handled according to the present invention, the texture on the sea surface is successively changed due to waves, and thus it is difficult to extract the natural feature points consistently observed in many frames enough to make the auto calibration possible. In order to ensure the performance of the auto calibration as described above, at least one hundred consistent natural feature points are required. However, since it is impossible to extract such many consistent natural feature points in the sea image, it is also impossible to apply the self-calibration method to the sea image.

On the recent filming spots, it is general that an assistance records camera status information such as a focal length for the following computer graphics (CG) work. However, since it is expected that an HD camera to be produced in the future is provided with a function of simultaneously recording the focal length data, it would be possible to implement an effective CG/real scene synthesis system, as avoiding the process of predicting even the camera internal variables such as the auto-calibration as described above.

SUMMARY OF THE INVENTION

Accordingly, the present invention is directed to a system and method for supporting augmented reality in an ocean scene that substantially obviate one or more problems due to limitations and disadvantages of the related art.

It is an object of the present invention to provide a system and method for supporting augmented reality in an ocean scene, which can extract external variables of a camera such as camera rotation, movement, and so forth, on the assumption that internal variables of the camera such as a focal length are known, in a sea background of which the texture is successively changed, in order to use the variables in the augmented reality for use in film production or production of videos such as computer graphics (CG) advertisement.

Here, the term 'augmented reality' means a technique of inserting a graphic object into a real-scene moving image, 'external variable' represents motion information of a camera, and 'internal variable' represents status information of the camera that includes a focal length of the camera, skew, aspect ratio, and principal point.

According to the present invention, when a moving image with a sea as its background and focal length information of a camera are inputted, motion of the camera such as camera rotation and movement is predicted from the input information, and rendering is performed so that there is no unnaturalness between a CG object and the changing background.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

In order to achieve the above and other objects, there is provided an apparatus for extracting a camera motion, according to the present invention, which includes a camera rotation information extraction means for acquiring a tilt and a yaw of a camera by extracting a horizontal line of a sea from an original image including a focal length, and acquiring a pan of the camera using the acquired yaw and long-distance background features of at least two first natural feature point tracking data existing in the original image; and a camera movement calculation means for sequentially calculating the camera movement from rotation angles obtained from the tilt, yaw, and pan of the camera and at least two natural feature point tracking data existing on a sea plane of the original image.

In another aspect of the present invention, there is provided a system for supporting augmented reality in an ocean scene using an apparatus for extracting a camera motion, which includes a camera rotation information extraction means for extracting camera rotation information from horizontal line information of a sea extracted from an original image including a focal length and at least two first natural feature point tracking data existing on a plane parallel to a sea plane, using long-distance background features; a camera movement calculation means for sequentially calculating camera movement from the camera rotation information and at least two natural feature point tracking data existing on the sea plane of the original image; and a means for placing a computer graphics object on a ground plane by importing camera position data, and performing a rendering as moving the camera.

In still another aspect of the present invention, there is provided a method of supporting augmented reality in an ocean scene using an apparatus for extracting a camera motion, which includes (a) extracting camera rotation information from horizontal line information of a sea extracted from an original image including a focal length and at least two first natural feature point tracking data existing on a sea plane and a plane parallel to the sea plane, using long-distance background features; (b) sequentially calculating camera movement from the camera rotation information and at least two natural feature point tracking data existing on the sea plane of the original image; and (c) placing a computer graphics object on a ground plane by importing camera position data, and performing a rendering as moving the camera.

It is to be understood that both the foregoing general description and the following detailed description of the present invention are exemplary and explanatory and are intended to provide further explanation of the invention as claimed.

BRIEF DESCRIPTION OF THE DRAWINGS

The patent or application file contains at least one color photograph drawing. Copies of this patent or patent application publication with color photograph drawing(s) will be provided by the Office upon request and payment of the necessary fee.

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

The apparatus for distributing same/different digital broadcasting streams in a heterogeneous home network and the method thereof according to the preferred embodiment of the present invention will now be explained in detail with reference to the accompanying drawings.

Figure 1:
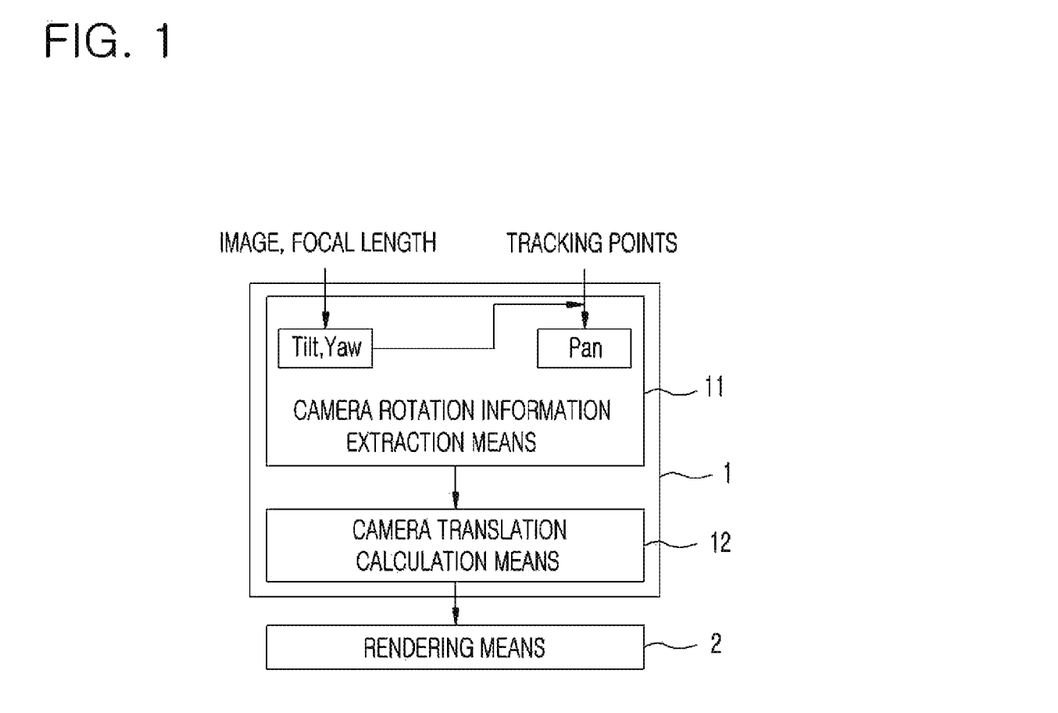
FIG. 1 is a block diagram illustrating the construction of an apparatus for supporting augmented reality in an ocean scene according to an embodiment of the present invention.
Figure 2:
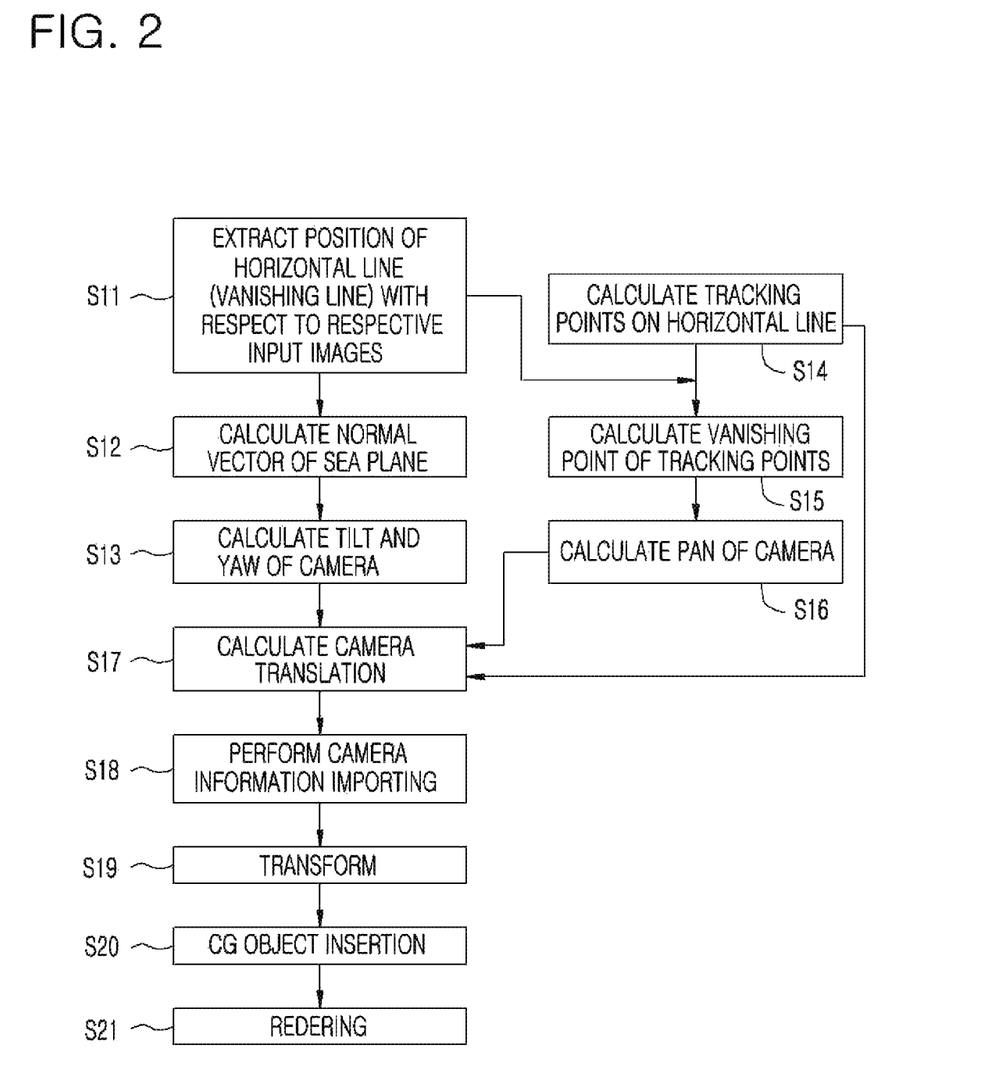
FIG. 2 is a flowchart illustrating the whole control flow of the apparatus for supporting augmented reality in an ocean scene according to an embodiment of the present invention.
Figure 3:
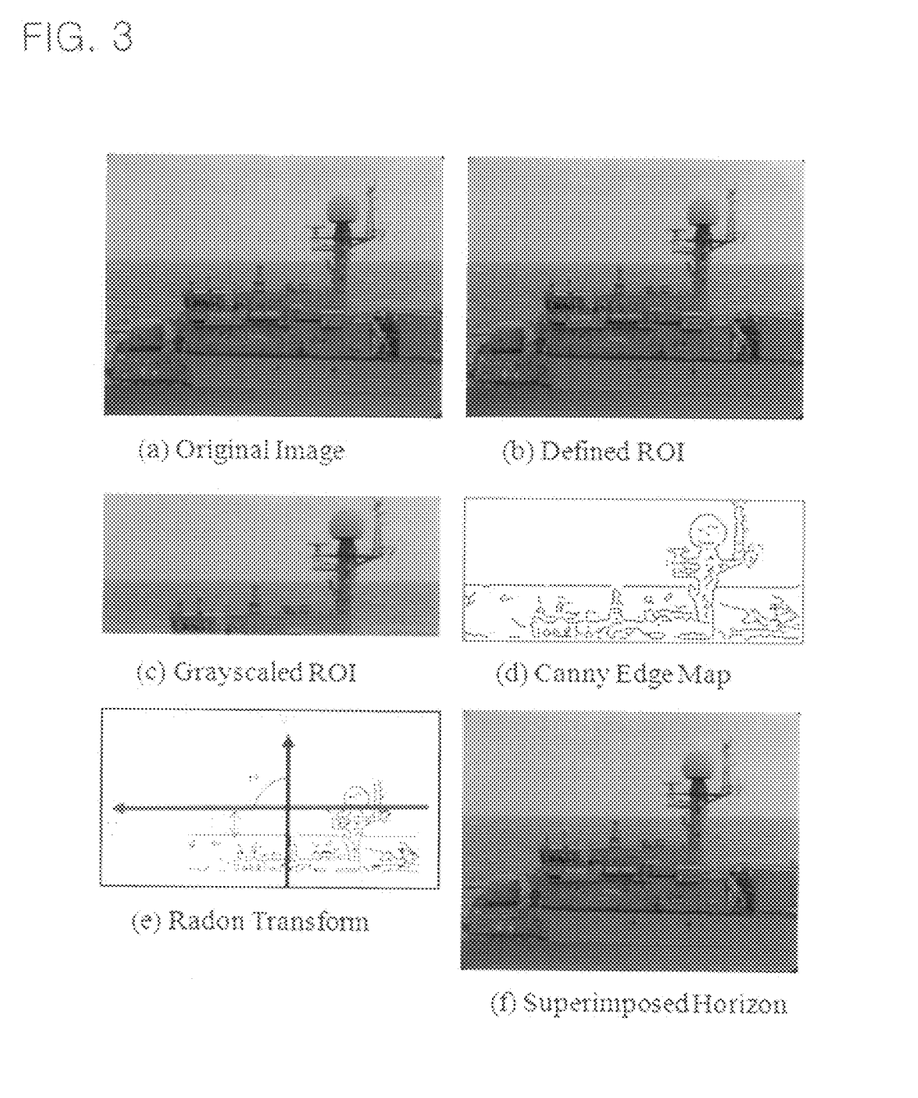
FIGS. 3A to 3F are conceptual views explaining a process of extracting horizontal line information in order to calculate a tilt and a yaw of a camera according to an embodiment of the present invention.
Figure 4:
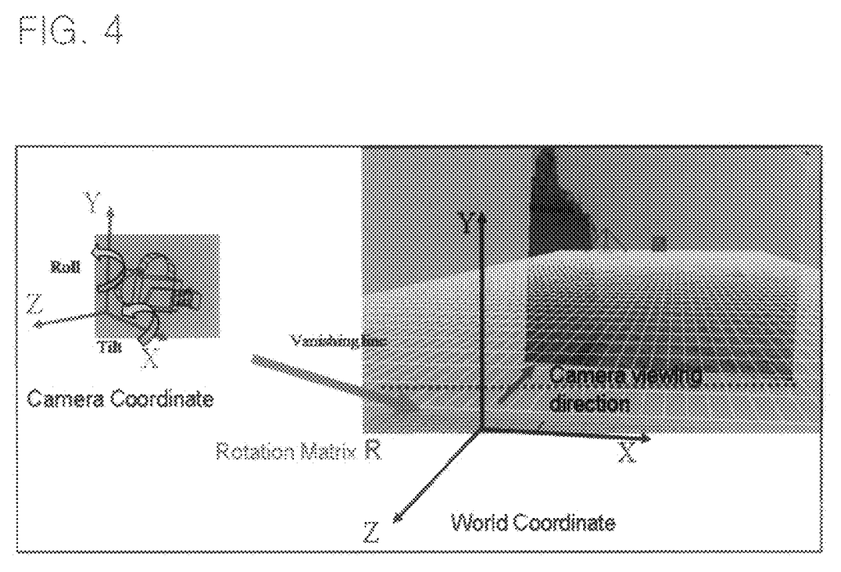
FIG. 4 is a view illustrating a relation between camera coordinate and world coordinate of a workspace of Maya software according to an embodiment of the present invention.
Figure 5:
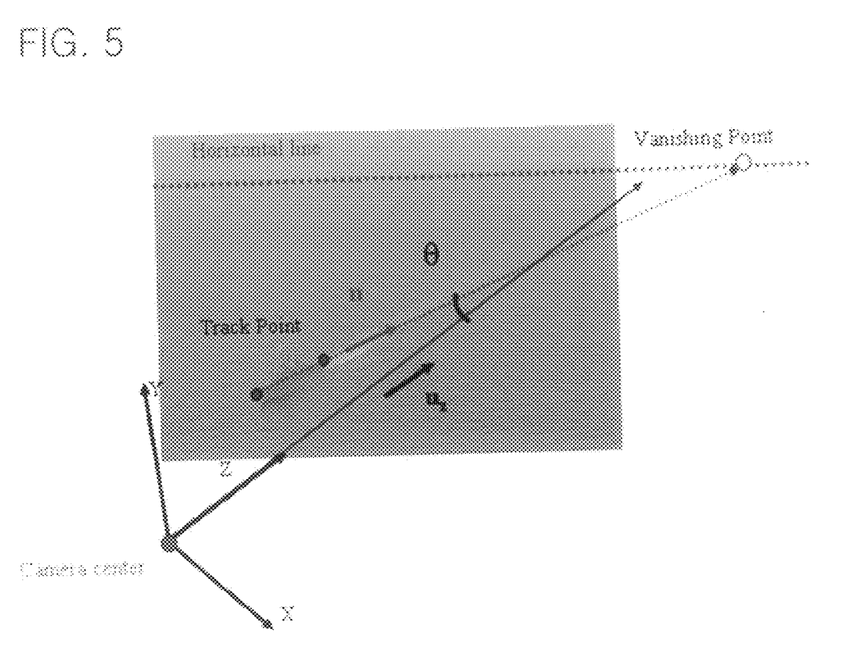
FIG. 5 is a conceptual view explaining a process of calculating a pan of a camera according to an embodiment of the present invention.
Figure 6:
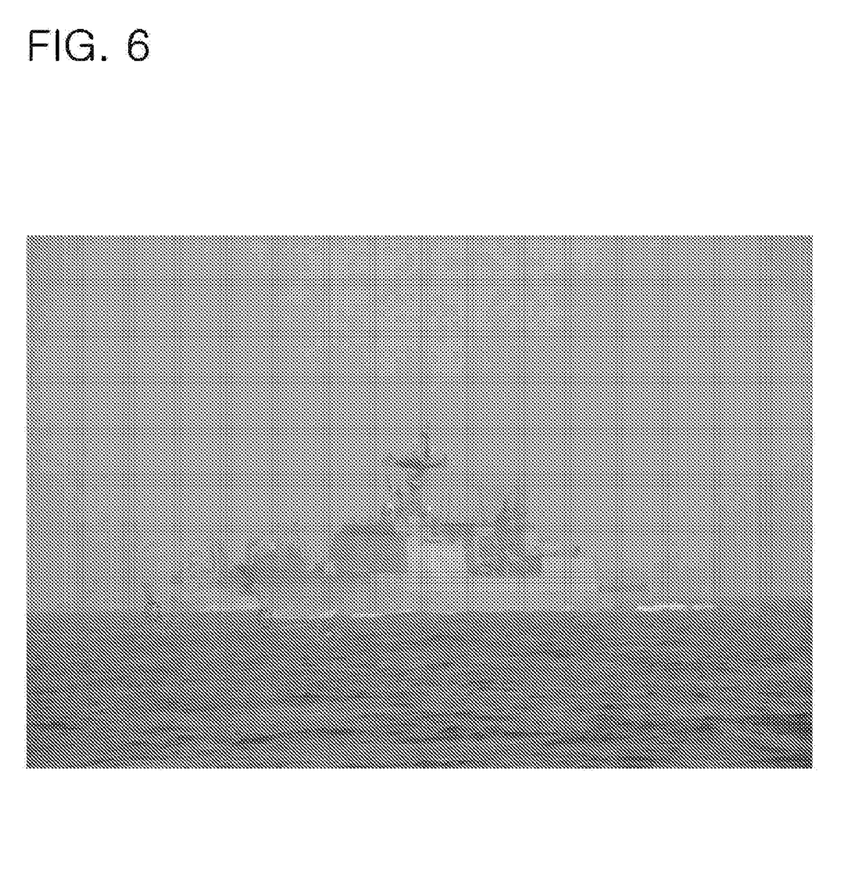
FIG. 6 is a view illustrating natural feature points on a sea plane that are selected to calculate movement of a camera according to an embodiment of the present invention.
Figure 7:
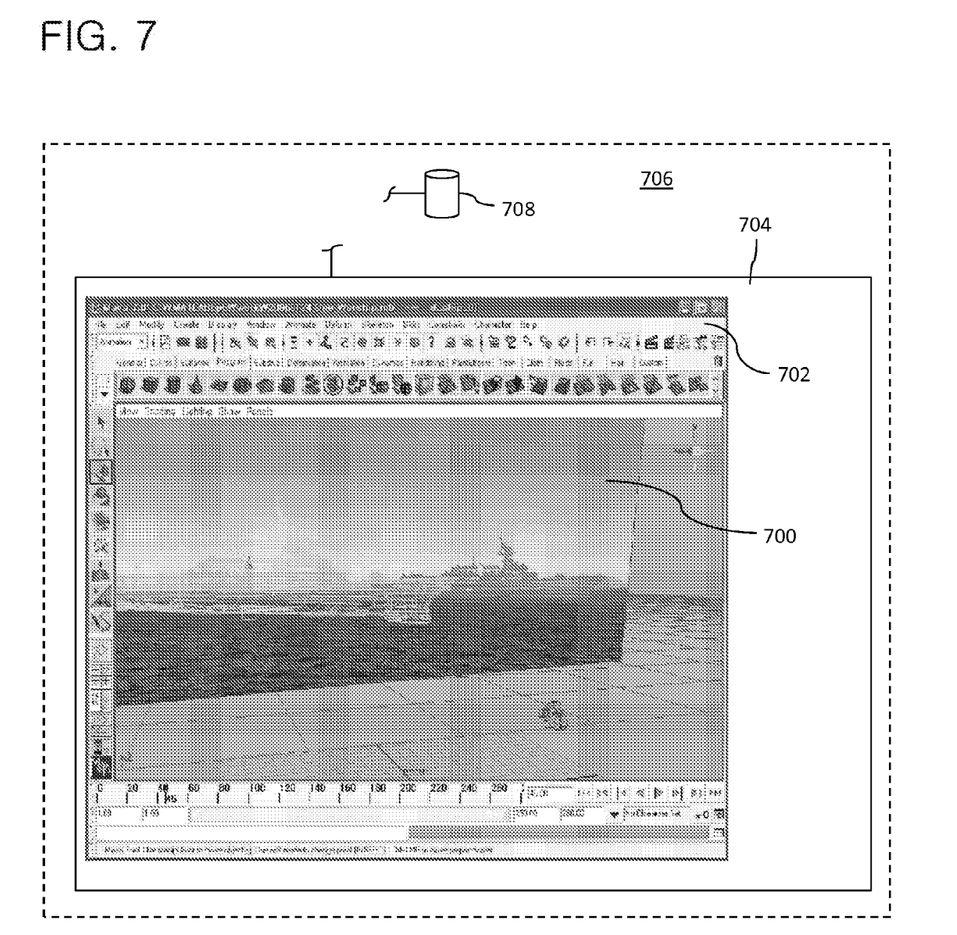
FIG. 7 is a view explaining a process of calling calculated camera motion data into a work environment of Maya software and inserting a CG object to obtain the final result according to an embodiment of the present invention.

FIG. 1 is a block diagram illustrating the construction of an apparatus for supporting augmented reality in an ocean scene according to an embodiment of the present invention, and FIG. 2 is a flowchart illustrating the whole control flow of the apparatus for supporting augmented reality in an ocean scene according to an embodiment of the present invention. FIGS. 3A to 3F are conceptual views explaining a process of extracting horizontal line information in order to calculate a tilt and a yaw of a camera according to an embodiment of the present invention. FIG. 4 is a view illustrating a relation between camera coordinate and world coordinate of a workspace of Maya software according to an embodiment of the present invention, and FIG. 5 is a conceptual view explaining a process of calculating a pan of a camera according to an embodiment of the present invention. FIG. 6 is a view illustrating natural feature points on a sea plane that are selected to calculate movement of a camera according to an embodiment of the present invention, and FIG. 7 is a view explaining a process of calling calculated camera motion data into a work environment of Maya softer and inserting a CG object to obtain the final result according to an embodiment of the present invention.

As illustrated in FIG. 1, the system for supporting augmented reality in an ocean scene according to an embodiment of the present invention includes a camera motion extraction means 1 for extracting a camera motion, and a rendering means for placing computer graphics (CG) on a sea ground plane on the basis of camera position information acquired from the camera motion extraction means 1 and performing a rendering.

The camera motion extraction means 1 includes a camera rotation information extraction means 11 for extracting camera rotation from horizontal line information of a sea and at least two natural feature point tracking data (hereinafter referred to as "first natural feature point tracking data") existing on a plane parallel to a sea plane, by utilizing prior knowledge about background geometry, on the assumption that the focal length of the camera is known; and a camera movement calculation means 12 for sequentially calculating camera movement from the calculated camera rotation and at least two natural feature point tracking data (hereinafter referred to as "second natural feature point tracking data") existing on the sea plane. Through this camera motion extraction means 1, the camera motion is extracted in a manner that the camera rotation is first calculated using long-distance background features and then the camera movement is sequentially calculated again on the basis of the result of calculation of the camera rotation, without simultaneously obtaining the camera rotation and the camera movement.

The camera rotation information extraction means 11 includes a means for extracting the horizontal line from an image inputted through an image input means, calculating and acquiring a tilt and a yaw of the camera from the horizontal line, and a means for acquiring a pan of the camera using the tilt, the yaw, and the first natural feature point tracking data inputted from an outside. In this case, the camera rotation information extraction means 11 may further include a means (not illustrated) for extracting the horizontal line information and tracking points from the original image.

The camera movement calculation means 12 includes a means for acquiring the camera position at the first frame on the basis of one natural feature point that exists on the sea plane at the first frame, on the basis of the calculated camera rotation angle, a means for acquiring the spatial coordinates of another natural feature point that exists on the sea plane using the calculated camera position at the first frame, and a means for acquiring the camera movement at the following frame using the calculated spatial coordinates of at least two natural feature points and the natural feature points at the respective frame images.

Using the camera motion extraction means 1 as constructed above, the camera rotation is calculated in advance from the long-distance information in the image, and then the camera movement is sequentially calculated through the tracking points existing at a short distance, on the basis of the result of calculation.

In the embodiment of the present invention, it is exemplified that other internal variables of the camera except for the focal length are simplified around "0" or image on the assumption that the focal length of the camera at the time of image capturing is known in advance, and the external variables of the camera (e.g., camera rotation and camera movement are obtained.

The process of extracting the camera motion according to an embodiment of the present invention will be described with reference to FIGS. 2 to 7.

At the first step, through Canny edge operation and Radon transform as Equation (1), the horizontal line is extracted from the original image. In this case, in order to discriminate the horizontal line from diverse line components existing on the background, the region of interest (ROI) is designated. In this case, any method of obtaining the horizontal line data can be used with no problem so far as the result of horizontal line extraction is accurate. The process of applying Radon transform is illustrated in FIGS. 3A to 3F. Specifically, the ROI is designated with respect to the original image, and the original image is transformed into a grayscale image. Thereafter, edges are obtained by performing the Canny edge operation, and then θ and x' are obtained through the Radon transform. Accordingly, the position of the horizontal line can be extracted at step (S11). The Radon transform is a transform that accumulates the pixel intensity by projecting the image in a vertical direction as rotating the image by 360°. By performing the Radon transform with respect to the image having passed through the Canny edge operation, θ and x' that maximize Equation (1) are found, and they may be the direction and the position of a remarkable line in the image. In Equation (1), θ denotes the angle of the corresponding line against a vertical axis in FIG. 3E, and x' denotes the position of the line when the image is projected in the corresponding direction. In FIGS. 3A to 3F, Y denotes the vertical axis, Y' denotes the vertical axis after the camera rotation and simultaneously the direction in which the pixel intensity is accumulated, and x' denotes the position of the line being presently considered on the projection.

$$R[f](\theta, x') = \int_{-\infty}^{\infty}\int_{-\infty}^{\infty} f(x, y)\delta(x\cos\theta + y\sin\theta - x')dxdy \quad (1)$$

At the second step, the tilt and the yaw of the camera are extracted from the horizontal line information as extracted above, which correspond to one rotation of the camera around X-axis and Z-axis in FIG. 4. On the understanding that the horizontal line extracted at the first step is a vanishing line against the sea plane, a normal vector n of the sea plane with respect to the camera can be obtained from Equation (2). In Equation (2), a, b, and c correspond to coefficients of a line equation of the horizontal line. Here, a plane obtained by modeling the sea plane in a Maya software environment is defined as a ground plane, and the tilt and the yaw of the camera can be obtained from the normal vector component of the ground plane using Equation (3) (S12 to S13). On the assumption that internal variables except for the focal length are "0", K is an internal variable matrix, and, $K^T$ represents a transpose matrix of K in Equation (2).

$$\begin{pmatrix} n_x \\ n_y \\ n_z \end{pmatrix} = n = K^T I = \begin{pmatrix} f & 0 & 0 \\ 0 & f & 0 \\ 0 & 0 & f \end{pmatrix}\begin{pmatrix} a \\ b \\ c \end{pmatrix} \quad (2)$$

$$\theta_x(\text{tilt}) = \arcsin\left(-\frac{n_z}{\sqrt{n_y^2 + n_z^2}}\right) \quad (3)$$

$$\theta_z(\text{yaw}) = \arcsin\left(\frac{n_x}{\sqrt{n_x^2 + n_y^2 + n_z^2}}\right)$$

At the third step, a pan of the camera that is a rotation around Y-axis in FIG. 4 is obtained using the vanishing line as obtained above and a newly obtained track point. In this case, the natural feature point data (i.e., first natural feature point tracking data) is obtained from the natural feature points that exist on the plane parallel to the sea plane through the use of a natural feature point tracker such as Kanade-Lucas-Tomasi (KLT) tracker (S14). In the embodiment of the present invention, a 'target tracker' function provided by 'Boujou' software is used. However, any other method or tracker may be used so far as it can consistently extract the nature feature points existing on the plane parallel to the sea plane and thus it does not greatly affect the performance of the whole system.

Then, an intersection of a line connecting two or more track points as obtained above and a vanishing line obtained at the second step is obtained as shown in FIG. 5, and this intersection is considered as the vanishing points (S15). Direction vectors u that lines respectively connecting the vanishing point and the track points in space are calculated using Equation (4) on the assumption that the directions of the direction vectors are fixed. In Equation (4), vp represents a vanishing point vector.

$$u = K^{-1} * vp \quad (4)$$

Then, by rotating the camera for the tilt and the yaw obtained at the second step and indicating the direction to which Z-axis is directed on the camera coordinate as $u_z$, the pan can be obtained from u and $u_z$ using Equation (5) (S16). In this case, the angle is set on the basis of the direction to which the vanishing point obtained in the above-described process is directed.

$$\theta(\text{pan}) = a\cos\left(\frac{u * u_z}{|u||u_z|}\right) \quad (5)$$

At the fourth step, the camera movement is obtained using the first natural feature point tracking data selected from the image on the basis of the camera rotation angle obtained at the third step. In this case, the second natural feature point tracking data can be obtained using the point tracker of commercial software such as 'Boujou' in the same manner as the second step. One notable thing is that the points existing on the sea plane should be necessarily selected. As shown in FIG. 6, floats incidentally floating about on the sea, the point where the front of a ship meets the sea surface, and foams in the case of a long-distance image may be used as the natural feature points within a short frame period. At least two natural feature points should be tracked and used, and in the embodiment of the present invention, two natural feature points are used for convenience in explanation. First, one natural feature point is set as a reference point of which the coordinates indicate the origin, and is substituted for $(X,Y,Z,1)^T$ in Equation (6). Since according to this natural feature point, the coordinates on an image plane and the spatial coordinates are known, the position of the camera $(C_1,C_2,C_3)^T$ at the first frame can be obtained in Equation (6).

$$s\begin{pmatrix} x \\ y \\ 1 \end{pmatrix} = KR[I|-C]\begin{pmatrix} X \\ Y \\ Z \\ 1 \end{pmatrix} \Rightarrow sR^T K^{-1}\begin{pmatrix} x \\ y \\ 1 \end{pmatrix} = \begin{pmatrix} X \\ Y \\ Z \end{pmatrix} - \begin{pmatrix} C_1 \\ C_2 \\ C_3 \end{pmatrix} \quad (6)$$

Using the camera position at the first frame as obtained above, the spatial coordinates of another natural feature point is obtained. Since this point also exists on the sea surface, its Y coordinate is "0", and its X and Z coordinates can be linearly calculated and obtained in Equation (7).

$$sx = PX \quad (7)$$

$$= (p_1 \quad p_2 \quad p_3 \quad p_4)\begin{pmatrix} X \\ 0 \\ Z \\ 1 \end{pmatrix}$$

$$= Xp_1 + Zp_3 + p_4 \Rightarrow \begin{pmatrix} s \\ X \\ Z \end{pmatrix}$$

$$= (x \quad -p_1 \quad -p_3)^{-1} p_4$$

Then, at the following frames, the translated camera positions are obtained using the spatial coordinates of the two natural feature points as obtained above and the camera rotation angles obtained at the second and third steps. In Equation (8), $(x,y,1)^T$ represents track data of the natural feature points on the image plane, and these coordinates have different values for the respective frames. In $(X,Y,Z)^T$, the spatial coordinates of the natural feature points as obtained above are substituted, and have the same value for all the frames. Using the data, $(C_1,C_2,C_3)$ can be calculated using Equation (8).

$$sR^T K^{-1}\begin{pmatrix} x \\ y \\ 1 \end{pmatrix} = s\begin{pmatrix} d_1 \\ d_2 \\ d_3 \end{pmatrix} \quad (8)$$

$$= \begin{pmatrix} X \\ Y \\ Z \end{pmatrix} - \begin{pmatrix} C_1 \\ C_2 \\ C_3 \end{pmatrix} \Rightarrow$$

$$\begin{pmatrix} d_3 & 0 & -d_1 \\ 0 & d_3 & -d_2 \end{pmatrix}\begin{pmatrix} C_1 \\ C_2 \\ C_3 \end{pmatrix}$$

$$= \begin{pmatrix} d_3 & 0 & -d_1 \\ 0 & d_3 & -d_2 \end{pmatrix}\begin{pmatrix} X \\ Y \\ Z \end{pmatrix}$$

Generally, although the camera rotation information obtained at the second and third steps is usually accurate, the translated camera position information obtained at the present step may have errors. This is because the used natural feature points themselves are not fixed to the sea plane, but are slightly shaken by waves. In order to solve this, it is required to add a smoothing process to the motion and to correct distinctive parts at the fifth step to follow.

At the fifth step, the camera motion data obtained as above is transformed so that Maya can call the transformed data (S18 to S19), the accuracy of the movement data is confirmed by Maya, in a state that a real image is placed on the image plane (i.e., picture at the back in FIG. 7) as a background, as the camera is moved along predicted tracks, and then the rendering is performed in a state that a CG object is place on the ground plane (i.e., plane having checkers) *S20) to obtain the final result (S21). In this step, by correcting some distinctive parts, more exquisite results can be obtained. FIG. 7 is a view explaining a process of placing a CG warship on a ground plane and performing a rendering as moving the camera. In the drawing, the plane having checkers is the ground plane, and the picture at the back is the image plane.

As described above, according to the system and method for supporting augmented reality in a ocean scene of the present invention, the camera rotation and the camera movement can be accurately calculated, assuming that the camera focal length information is known at the time of capturing a moving image with a sea image for a background, and thus the CG/real scene synthesis with the sea for a background can be accomplished more realistically and accurately during the production of videos such as movie and drama.

While the present invention has been described and illustrated herein with reference to the preferred embodiment thereof, it will be understood by those skilled in the art that various changes and modifications may be made to the invention without departing from the spirit and scope of the invention, which is defined in the appended claims.

What is claimed is:

1. An apparatus for extracting a camera motion, comprising:

a camera rotation information extraction means for acquiring a tilt and a yaw of a camera by extracting a horizontal line of a sea from an original image and focal length data provided by the camera, and acquiring a pan of the camera using the acquired yaw and long-distance background features of a vanishing point calculated from at least two first natural feature point tracking data existing in the original image; and a camera movement calculation means for calculating the camera movement from rotation angles obtained from the tilt, yaw, and pan of the camera and at least two second natural feature point tracking data existing on a sea plane of the original image, wherein the camera rotation information extraction means extracts camera rotation from horizontal line information of a sea and at least two natural feature point tracking data existing on a plane parallel to a sea plane, by utilizing prior knowledge about a background geometry, on the assumption that the focal length of the camera is known, and wherein the apparatus for extracting camera motion calculates tilt, yaw from horizontal line information, calculates pan from the prior calculated tilt, yaw and first natural feature point tracking data, and calculates camera translation from the prior calculated tilt, yaw and second natural feature point tracking data, where the aforementioned each camera movement parameter is calculated sequentially.

2. The apparatus of claim 1, wherein the extraction of the horizontal line of the sea is performed through a Canny edge operation and a Radon transform.

3. The apparatus of claim 1, wherein the camera movement calculation means comprises:
   a means for acquiring a camera position at a first frame on the basis of one natural feature point p that exists on a sea plane at the first frame, using the tilt, yaw, and pan of the camera;
   a means for acquiring spatial coordinates of another natural feature point q that exists on the sea plane, using the camera position at the first frame; and
   a means for acquiring the camera movement at the following frame, using the spatial coordinates of the natural feature points p and q and the natural feature points at the respective frame images.

4. A system for supporting augmented reality in an ocean scene using an apparatus for extracting a camera motion, the system comprising:
   a host computer configured to receive from a camera an original image, and focal length data;
   a camera rotation information extraction means for extracting camera rotation information from horizontal line information of a sea extracted from the focal length data provided by a camera and an original image from the camera and at least two first natural feature point tracking data existing on a plane parallel to a sea plane, using long-distance background features;
   a camera movement calculation means for calculating camera movement from the camera rotation information and at least two second natural feature point tracking data existing on the sea plane of the original image; and
   a means for placing a computer graphics object on a ground plane by importing camera position data, and performing a rendering according to the movement of the camera,
   wherein the camera rotation information extraction means extracts camera rotation from horizontal line information of a sea and at least two natural feature point tracking data existing on a plane parallel to a sea plane, by utilizing prior knowledge about background geometry, on the assumption that the focal length of the camera is known, wherein the apparatus for extracting a camera motion calculates tilt, yaw from horizontal line information, calculates pan from the prior calculated tilt, yaw and first natural feature point tracking data, and calculates camera translation from the prior calculated tilt, yaw and second natural feature point tracking data, where the aforementioned each camera movement parameter is calculated sequentially.

5. The system of claim 4, wherein the camera rotation information extraction means comprises:
   a means for extracting the horizontal line and the first natural feature point tracking points from the image;
   a means for acquiring a tilt and a yaw of the camera from a normal vector of the sea plane; and
   a means for acquiring a pan of the camera using the tilt and the yaw of the camera and the tracking points.

6. The system of claim 4, wherein the camera movement calculation means comprises:
   a means for acquiring a camera position at a first frame on the basis of one natural feature point p that exists on a sea plane at the first frame, using the camera rotation information;
   a means for acquiring spatial coordinates of another natural feature point q that exists on the sea plane, using the camera position at the first frame; and
   a means for acquiring the camera movement at the following frame, using the spatial coordinates of the natural feature points p and q and the natural feature points at the respective frame images.

7. A method of supporting augmented reality in an ocean scene using an apparatus for extracting a camera motion, the method comprising:
   (a) receiving focal length data and an original image from a camera;
   (b) extracting camera rotation information from horizontal line information of a sea extracted from the original image and at least two first natural feature point tracking data existing on a sea plane and a plane parallel to the sea plane, using long-distance background features;
   (c) calculating camera movement from the camera rotation information and at least two second natural feature point tracking data existing on the sea plane of the original image; and
   (d) placing a computer graphics object on a ground plane by importing camera position data, and performing a rendering according to the movement of the camera,
   wherein the step (b) comprises:
   extracting the horizontal line information from the input image;
   calculating a normal vector n of the sea plane from position of the horizontal line and acquiring a tilt and a yaw of the camera therefrom; and
   calculating vanishing point on horizontal line using the tilt and the yaw of the camera and the externally inputted natural feature point tracking data and acquiring a pan of the camera from the vanishing point information and the acquired tilt and yaw,
   wherein the horizontal line extracted at the step (b) is a vanishing line against the sea plane, and obtains the normal vector n of the sea plane with respect to the camera, and
   wherein the tilt and the yaw of the camera is obtained from the normal vector component of the ground plane using the following Equation (3), $$\theta_x(tilt) = \arcsin\left(-\frac{n_z}{\sqrt{n_y^2 + n_z^2}}\right) \quad (3)$$

$$\theta_z(yaw) = \arcsin\left(-\frac{n_x}{\sqrt{n_x^2 + n_y^2 + n_z^2}}\right)$$

wherein $n_x$, $n_y$, and $n_z$ are each component of the normal vectors.

8. The method of claim 7, wherein the step of extracting the horizontal line information comprises:
designating a region of interest (ROI) with respect to the input image;
transforming the designated ROI into a grayscale;
obtaining edges by performing a Canny edge operation; and
extracting the horizontal line information through a Radon transform.

9. The method of claim 7, wherein the step (c) comprises:
acquiring a camera position at a first frame on the basis of one natural feature point p that exists on a sea plane at the first frame, using the camera rotation information;
acquiring spatial coordinates of another natural feature point q that exists on the sea plane, using the camera position at the first frame; and
acquiring the camera movement at the following frame, using the spatial coordinates of the natural feature points p and q and the natural feature points at the respective frame images.

* * * * *